(12) United States Patent
Martin et al.

(10) Patent No.: US 9,097,735 B2
(45) Date of Patent: Aug. 4, 2015

(54) PROBE FOR MEASURING THE TOTAL PRESSURE OF AN AIRFLOW AND METHOD OF USING THE PROBE

(71) Applicant: THALES, Neuilly-sur-Seine (FR)

(72) Inventors: Frederic Martin, Vendome (FR); Serge Desbiolles, Vendome (FR); Jacques Mandle, Valence (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/189,875

(22) Filed: Feb. 25, 2014

(65) Prior Publication Data
US 2014/0245830 A1 Sep. 4, 2014

(30) Foreign Application Priority Data
Mar. 1, 2013 (FR) ...................................... 13 00464

(51) Int. Cl.
*G01P 5/165* (2006.01)
*G01C 21/00* (2006.01)

(52) U.S. Cl.
CPC ...................................... *G01P 5/165* (2013.01)

(58) Field of Classification Search
CPC ................................ G01P 5/165; G01C 21/00
USPC ...................................................... 73/178 R
See application file for complete search history.

(56) References Cited

U.S. PATENT DOCUMENTS

| 4,000,647 A | | 1/1977 | Tauchmann |
| 4,395,907 A | * | 8/1983 | Morita et al. ................. 73/202.5 |
| 5,257,536 A | | 11/1993 | Beigbeder et al. |
| 5,337,602 A | * | 8/1994 | Gibson ........................... 73/182 |
| 6,250,801 B1 | * | 6/2001 | Bernard ........................ 374/138 |
| 6,557,243 B2 | * | 5/2003 | Feeley et al. .................... 29/611 |
| 6,588,285 B1 | * | 7/2003 | Vozhdaev et al. .......... 73/861.65 |
| 7,124,630 B2 | * | 10/2006 | Hanson et al. ............. 73/170.02 |

FOREIGN PATENT DOCUMENTS

| FR | 2665539 A1 | 2/1992 |
| GB | 530722 A | 12/1940 |

* cited by examiner

*Primary Examiner* — Lisa Caputo
*Assistant Examiner* — Jamel Williams
(74) *Attorney, Agent, or Firm* — Baker & Hostetler LLP

(57) ABSTRACT

A probe for measuring the total pressure of an airflow is intended to equip an aircraft and a method of using the probe. The probe comprises a Pitot tube, two separate heating wires supplied separately and allowing each one to heat an external part of the probe, and means of distribution of a given maximum power to each of the two heating wires as a function of the current temperature of each of the two parts. A method consists in giving priority to the reaching of a predefined minimum temperature of a first of the two parts of the probe by allocating to the first part of the probe a predefined share of the given maximum power for as long as the temperature of the first part is below a predefined minimum temperature.

11 Claims, 3 Drawing Sheets

PROBE FOR MEASURING THE TOTAL PRESSURE OF AN AIRFLOW AND METHOD OF USING THE PROBE

CROSS-REFERENCE TO RELATED APPLICATION

This application claims priority to foreign French patent application No. FR 1300464, filed on Mar. 1, 2013, the disclosure of which is incorporated by reference in its entirety.

FIELD OF THE INVENTION

The invention relates to a probe for measuring the total pressure of an airflow and a method of using the probe.

BACKGROUND

The piloting of any aircraft necessitates knowing its relative speed with respect to the air, that is to say to the relative wind. This speed is determined with the help of probes measuring the static pressure Ps and the total pressure Pt, as well sensors measuring the angle of incidence $\alpha$ and the sideslip angle $\beta$. $\alpha$ and $\beta$ provide the direction of the speed vector in a reference system related to the aircraft and Pt-Ps provides information which, in combination with the air temperature, makes it possible to calculate the modulus of that speed vector. These five aerodynamic parameters therefore make it possible to determine the speed vector of any aircraft, such as for example an aeroplane or a helicopter.

The total pressure Pt is usually measured using a so-called Pitot tube. This is a tube that is open at one of its ends and obstructed at the other. The open end of the tune substantially faces the airflow.

The airstream situated upstream of the tube is progressively slowed down until it reached a virtually zero speed at the intake of the tube. The slowing down of the speed of the air increases the pressure of the air. This increased pressure forms the total pressure Pt of the airflow. The air pressure existing inside the Pitot tube is measured.

In order to be able to operate in humid conditions, this Pitot tube is electrically heated. The heating prevents the tube from being obstructed by water or even by ice during flights in icing conditions and makes it possible to remove all traces of humidity during operation on the ground. This tube is provided with one or more bleed holes and water traps in order to prevent any rising of water in the total pressure ducting. The bleed holes make it possible to evacuate the water that has penetrated into the Pitot tube. The nominal operation of the Pitot tube involves heating in order to prevent the accumulation of water. In order to carry out a correct total pressure measurement, the Pitot tube is mounted on a mast making it possible to distance the tube from the skin of the aircraft and thus to carry out the pressure measurement out of the boundary layer of the flow developing in the vicinity of the skin. The mast can be fixed or mobile in the case of a probe designed to be oriented along the axis of the airflow.

The heating of the probe is commonly carried out by means of a heating resistor produced in the form of a wire wound in the body of the probe, that is to say both in the mast and in the Pitot tube. The heating of the probe can be regulated by measuring the temperature of the probe in order to adapt the electrical consumption to the external conditions resulting in the cooling of the probe. This type of regulation however necessitates a large maximum electrical power in order to achieve adequate heating of the probe.

At present, it is being sought to reduce all forms of energy consumption and the invention is included in this objective by making it possible to reduce the maximum power necessary for the heating in order to allow a correct measurement of the total pressure in all of the conditions encountered by the aircraft.

SUMMARY OF THE INVENTION

For this purpose, the invention relates to a probe for measuring the total pressure of an airflow, the probe being intended to equip an aircraft, the probe comprising a Pitot tube, furthermore comprising two separate heating wires heated separately, allowing each one to heat a part of the probe, and means of distributing a given maximum power to each one of the two heating wires as a function of the temperature of each of the two parts.

The invention also relates to a method of using a probe according to the invention, consisting in giving priority to the reaching of a predefined minimum temperature by the first of the two parts of the probe by allocating a predefined share of the given maximum power to the first part of the probe as long as the temperature of the first part is below the predefined minimum temperature.

BRIEF DESCRIPTION OF THE DRAWINGS

The invention will be better understood and other advantages will become apparent on reading the detailed description of an embodiment given by way of example, this description being illustrated by the appended drawings in which.

For reasons of clarity, the same elements bear the same references in the different figures.

DETAILED DESCRIPTION

Figure 1:
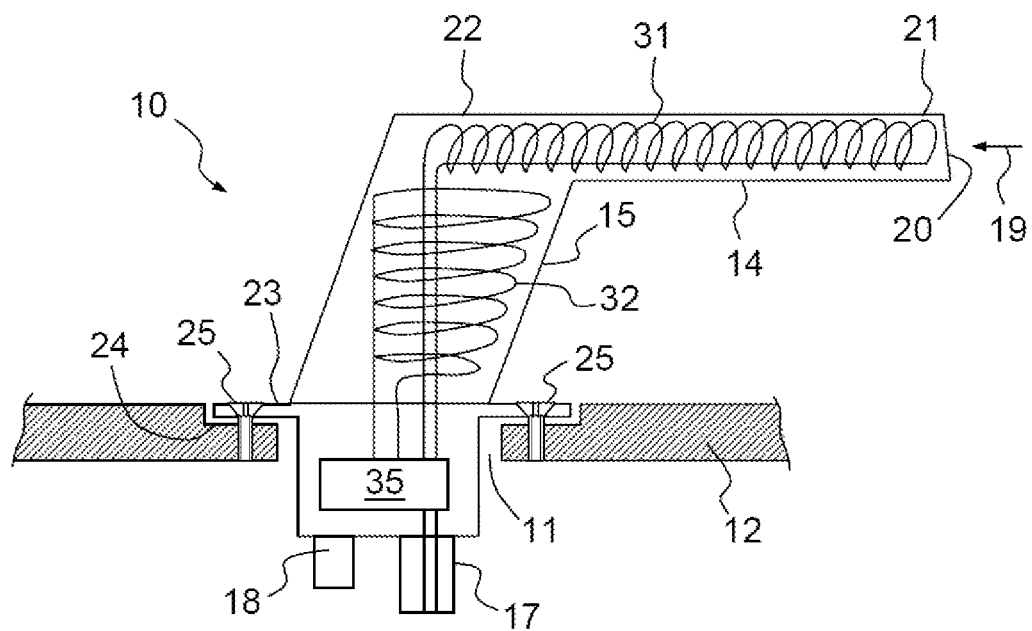
FIG. 1 shows a probe for measuring total pressure according to the invention.

FIG. 1 shows a probe for measuring total pressure 10 intended to be fixed such that it traverses an opening 11 formed in the skin 12 of an aircraft. The probe 10 comprises two parts outside of the skin 12 and formed by a Pitot tube 14 and by a mast 15 bearing the Pitot tube 14. The probe 10 also comprises a part inside of the skin 12 comprising an electrical connector 17 and a pneumatic connector 18. The connector 18 allows the pneumatic connection of the Pitot tube 14 to a pressure sensor situated inside the fuselage 12 of the aircraft. The probe 10 is positioned on the skin 12 of the aircraft in such a way that the Pitot tube 14 is oriented substantially along a longitudinal axis of the aircraft, out of the boundary layer, so that the direction of the airflow, represented by an arrow 19, substantially faces an inlet orifice 20 situated at a first end 21 of the Pitot tube 14.

A second end 22 du Pitot tube 14, opposite to the end 21, is closed so as to create a stop point in the airstream taken from the airflow and penetrating into the tube 14 through its orifice 20. At the end 22 of the tube, a pneumatic channel, not shown in FIG. 1, opens into the tube 14 in order to form a pressure intake there at which level it is sought to measure the air pressure. The channel is for example connected to a pressure sensor or to another pressure-measuring device. The pressure sensor makes it possible to effectively measure the air pressure existing inside the tube 14 at the level of its obstructed end 22. The pressure sensor can be integral with the probe or it can be remote. In this case, the pressure sensor is connected to the probe 10 by means of a pipe and of the pneumatic connector 18.

At the end 22, the tube 14 comprises one or more bleed holes that are not shown and which allow the evacuation of the water penetrating into the inside of the tube 14. Except for the bleed hole or holes, whose cross-section is small with respect to that of the tube 14, the tube 14 is closed at its end 22. The pressure measured at this end therefore represents the total pressure Pt of the airflow.

The mast 15 bears the Pitot tube 14 at the level of its second end 22. The Pitot tube 14 has a substantially cylindrical shape and the mast 15 has an elongated shape. The mast 15 has for example the shape of a wing whose lower surface and upper surface can be symmetrical. The two external parts of the probe 10, Pitot tube 14 and mast 15, are of dissimilar shapes. It is of course possible to distinguish two parts of the probe 10 other than the Pitot tube 14 and the mast 15, notably if the probe 10 comprises other pressure intakes, such as for example pressure intakes disposed on the mast 15 and making it possible to define the local incidence of the airflow with respect to the probe 10 or measuring the static pressure. The first part of the probe 10 can therefore comprise the Pitot tube 14 and a portion of the mast 15 closest to the Pitot tube 14, this portion containing the incidence pressure intakes.

The probe comprises fixing means designed to fix the probe 10 to the skin 12 of the aircraft. These means comprise for example a base 23 formed by a shoulder intended to come into contact with a spot facing 24 formed in the skin 12. Screws 25 disposed around the opening 11 immobilise the base 23 with respect to the skin 12.

In the example shown, the Pitot tube 14 is fixed with respect to the skin 12 of the aircraft. It is of course possible to mount the Pitot tube 14 on a mobile mast such as for example a plate that can be oriented in the axis of the airflow, such as for example described in the patent published under the reference number FR 2 665 539 and lodged on the 3 Aug. 1990. The base 23 then comprises a pivot connection allowing the rotation of the mast 15 with respect to the skin 12 about an axis perpendicular to the skin 12. Thus, when the local incidence of the airflow, in the vicinity of the probe 10 varies, the orientation of the Pitot tube 14 follows this incidence in order to always face the airflow. The measurement of total pressure is thereby improved during local variation of incidence of the airflow along the skin 12 of the aircraft.

The connector 17 allows the electrical connection of the probe 10 to the aircraft, notably for connecting means for heating the probe 10 assembly. These heating means comprise a first heating wire 31 allowing the heating of the Pitot tube 14 over the whole of its length and a second heating wire 32 allowing the heating of the mast 15. More generally, the two external parts of the probe are heated separately by each of the heating wires 31 and 32. The two heating wires 31 and 32 can be made from a material whose resistivity varies as a function of temperature. During its use, it is possible to measure the value of the resistance of each of the heating wires 31 and 32 in order to determine the average temperature of each of the two external parts of the probe: the Pitot tube and the mast 15. The measurement of resistance is advantageously carried out by measuring the value of the current flowing in each of the heating wires whilst the wires are being supplied for the heating. With a positive temperature coefficient, the resistance of the wire increases as its temperature increases and a regulation of the electrical power used for heating the probe is thus obtained.

The supplying of the two heating wires 31 and 32 is separate in order to be able to heat the Pitot tube 14 and the mast 15 separately. The separate supplying has the advantage of allowing a separate measurement of current and therefore of temperature of the Pitot tube 14 and of the mast 15 in order to optimize the heating of these two external parts of the probe 10.

The temperature measurement can also be carried out by separate sensors of the heating wires 31 and 32. In this case, a first sensor is disposed in the Pitot tube 14 and a second sensor is disposed in the mast 15.

In order to limit the electrical consumption of the probe for its heating, the probe itself limits its maximum power consumed to a given value and in order to do this it comprises means 35 of distribution of a given maximum power to each of the two heating wires 31 and 32 as a function of a temperature of each of the two external parts of the probe 10. The distribution means 35 can be integral with the internal part of the probe 10, upstream or downstream of the electrical connector 17. By way of example, the maximum power value can be of the order of 300 W.

The electrical power necessary for heating the probe 10 can be distributed by the aircraft to the probe by means of an AC voltage. In order to use this power supply variant, it is common to install a 115V-400 Hz electrical system on board aircraft. It is of course understood that the invention is not limited to this type of AC system. A 230V-400 Hz system is seen for example in certain recent aircraft.

The distribution means 35 are advantageously arranged to alternately distribute to each one of the heating wires 31 and 32 the total power available during a number of complete alternations, that is to say alternations of the AC voltage, for each of the heating wires, the ratio between the numbers of alternations of each of the heating wires being defined in order to obtain the desired distribution of power between the two heating wires. The fact of alternating the power supply of the heating wires at the time of a change of alternation makes it possible to carry out the change at the time of the passage through zero of the current in the AC power supply. This facilitates the action of the distribution means 35.

When the heating wires are formed by a resistance that varies with its temperature, the temperature of each one of the two parts 14 and 15 of the probe 10 can be defined by supplying the two heating wires 31 and 32 simultaneously in parallel with the AC voltage during at least one complete alternation and by measuring the value of the current flowing in each one of the heating wires 31 and 32 during the simultaneous supplying.

Figure 2:
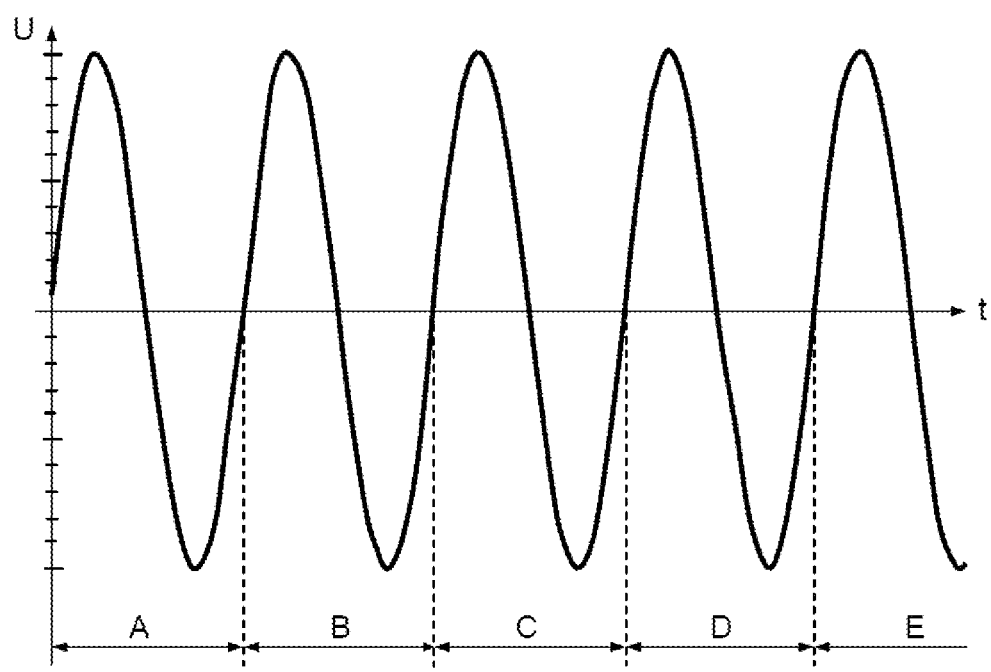
FIG. 2 illustrates a distribution of the power between two parts of a probe according to shown FIG. 1, the heating wires of which are supplied with AC voltage, the distribution being carried out by complete alternation of the AC voltage.

FIG. 2 illustrates the distribution of the power per alternation and the measurement of temperature carried out during a same alternation. This figure represents, in the form of a timing diagram, the variation of the supply voltage U of the probe over time t. Five alternations are shown in this figure. During the alternation A, the two heating wires 31 and 32 are supplied and it is possible to measure the temperature of the two heating wires 31 and 32 simultaneously. During the alternations B and C, only the heating wire 31 heating the Pitot tube 14 is supplied. During the alternation D, only the heating wire 32 heating the mast 15 is supplied. During the alternation E, the two heating wires 31 and 32 are supplied in order to again measure the temperatures of the external parts of the probe 10. When an AC system is used, its pulsation is generally much greater than a characteristic duration of the thermal inertia of the various parts of the probe 10. It is therefore possible to only periodically measure the temperature of the parts of the probe, in this case every four alternations. A longer periodicity is of course possible. It is also possible to consider measuring the temperature of each part of the probe when only the part in question is supplied.

Figure 3:
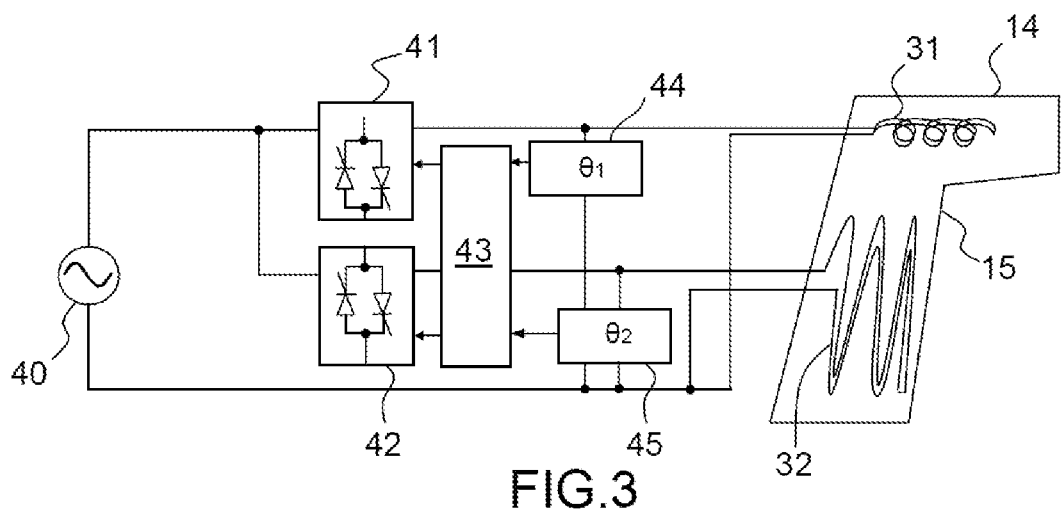
FIG. 3 shows a probe according to FIG. 1, the heating wires of which are supplied with AC voltage.

FIG. 3 shows an example of a probe according to FIG. 1, whose heating wires 31 and 32 are supplied by an AC voltage source 40. The distribution means 35 comprise two groups of electronic switches 41 and 42, for example thyristor switches, controlled by a management module 43. The group 41 supplies the heating wire 31 and the group 42 supplies the heating wire 32. The distribution means 35 furthermore comprise two temperature measuring means 44 and 45, the means 44 measuring the temperature of the Pitot tube 14 and the means 45 measuring the temperature of the mast 15 by measuring the current flowing in the associated heating wire. The module 43 receives the temperature information delivered by the means 44 and 45.

The electrical power necessary for heating the probe 10 can be distributed by the aircraft to the probe by means of a DC voltage. In order to use this variant power supply, it is common to have, on board aircraft, a DC electric power system, for example at 28V, and on certain recent aircraft a 270 V DC power system. Any other DC voltage can of course be used for the implementation of the invention.

Figure 4:
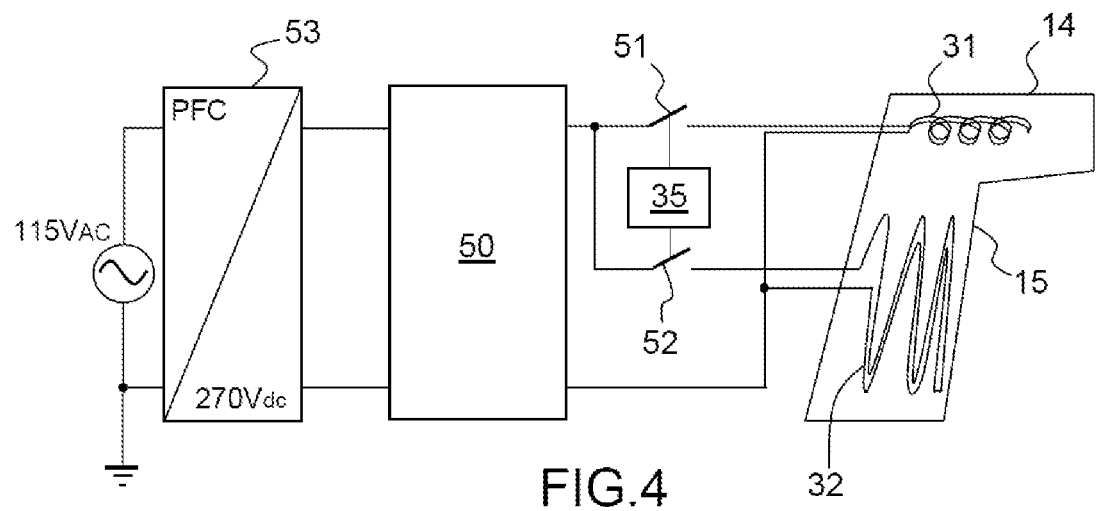
FIGS. 4 and 5 show two variant embodiments of a probe according to FIG. 1, the heating wires of which are supplied with DC voltage.
Figure 5:
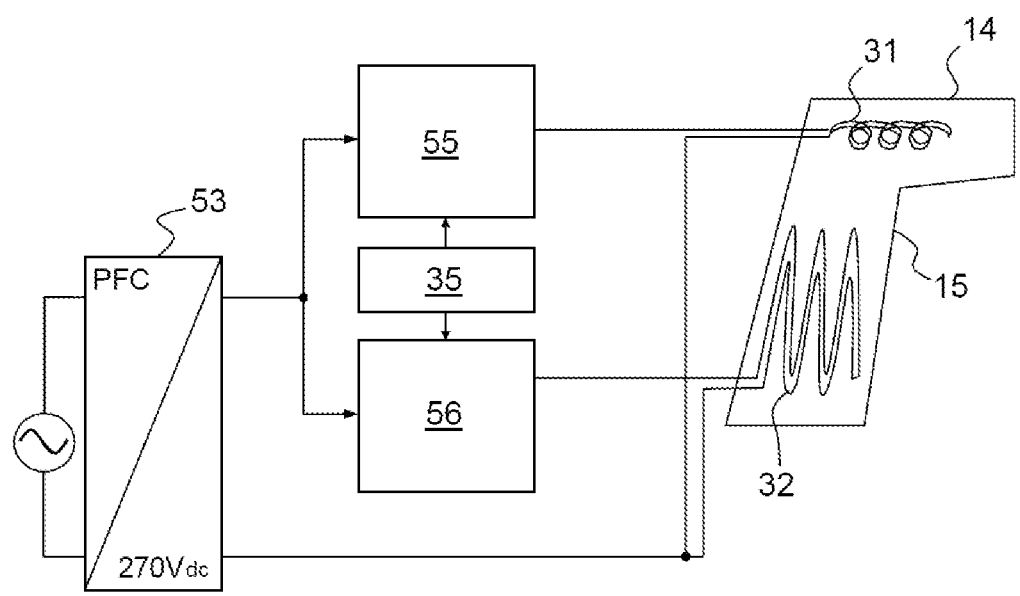

FIGS. 4 and 5 show two variant embodiments of a probe according to FIG. 1, whose heating wires 31 and 32 are supplied by a DC voltage source.

In the variant shown in FIG. 4, the probe comprises a converter 50 delivering a DC voltage and supplying the heating wires 31 and 32 by the intermediary of switches 51 and 52, respectively associated with the heating wires 31 and 32. The distribution means 35 are arranged to control the switches 51 and 52 as a function of the desired power distribution. The converter 50 can be an AC/DC converter or a DC/DC converter as shown. In the variant shown in FIG. 4, the converter 50 is a voltage lowering converter and is supplied by a 270V DC voltage. The converter 50 is power regulated at a given maximum power, for example 300 W. The 270V DC voltage can be supplied by a system of the aircraft or it can be supplied by an AC/DC converter 53 having a power factor corrector, referenced PFC. The converter 53 is for example supplied by the on-board 115V-400 Hz system.

In the variant shown in FIG. 5, the probe 10 comprises a converter 55 associated with the heating wire 31 and a converter 56 associated with the heating wire 32. The distribution means 35 are arranged to control the converters 55 and 56 as a function of the desired power distribution. The converters 55 and 56 can be AC/DC converters or DC/DC converters as shown. In the variant shown in FIG. 5, the converters 55 and 56 are voltage lowering converters and are supplied by a 270V DC voltage which can be supplied by the converter 53.

In this variant, it is possible to carry out a simultaneous linear regulation of the temperature of the two parts of the probe 10. This temperature can be measured directly by the current flowing in the two heating wires 31 and 32.

Figure 6:
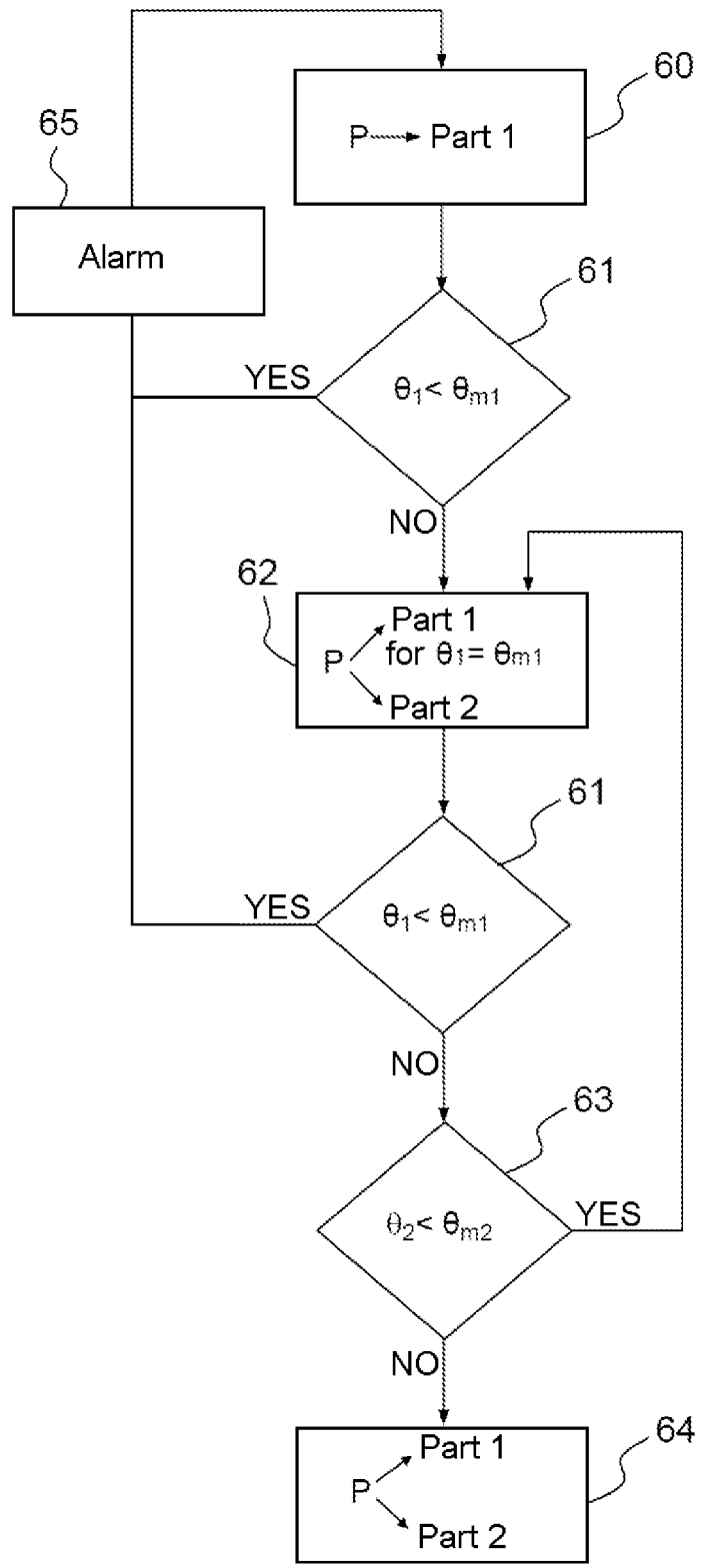
FIG. 6 shows an example flowchart of a method for using a probe according to the invention.

FIG. 6 shows an example of a flowchart of a method of using a probe according to the invention. This method can be used in the different variants of probes whether they are supplied with DC or with AC voltage. The method makes it possible to limit the power consumed by the probe for its heating by making best use of the given maximum power.

In a first mode of distribution of the given maximum power, priority is given to the reaching of a predefined minimum temperature $\theta_{m1}$ of a first one of the two parts of the probe 10. The first part is advantageously the Pitot tube 14. This first mode is carried out by allocating to the Pitot tube 14 a predetermined share of the given maximum power P for as long as the current temperature $\theta_1$ of the Pitot tube 14 is lower than the predefined minimum temperature $\theta_{m1}$. The predefined share is for example the whole of the given maximum power P. It is also possible to allocate to the second part of the probe 10 (the mast 15), a small share of the given maximum power P, for example of the order of 5 to 10%. This small share for example makes it possible to know the temperature of the second part of the probe 10 when the measurement of temperature is carried out by means of measuring the current in the corresponding heating wire. The first distribution mode is shown in FIG. 6 by the step 60 which consists in supplying the heating wire 31 and by the test 61 which consists in comparing the current temperature $\theta_1$ of the Pitot tube 14 with the predefined minimum temperature $\theta_{m1}$. As long as the result of the test 61 is positive, the prioritized heating of the Pitot tube 14 is continued.

If the result of the test 61 is negative, that is to say that the first part of the probe 10 has reached the predefined minimum temperature $\theta_{m1}$, it is possible to change the mode of distribution of the power P between the two heating wires 31 and 32.

At the time of this change, it is advantageously possible to change to a second distribution mode, shown in FIG. 6 by the step 62 which consists in allocating to the first part (the Pitot tube 14) a variable share of the given maximum power P adapted to keep the first part at its predefined minimum temperature $\theta_{m1}$, and in allocating to the second of the two parts (the mast 15) of the probe 10 the rest of the maximum available power P.

The second distribution mode can be continued as long as the current temperature $\theta_2$ of the second part (Ie mast 15) remains below a predefined minimum temperature $\theta_{m2}$ of the second part. It is possible to choose the same values of predefined minimum temperature for both parts of the probe 10, that is to say $\theta_{m1}=\theta_{m2}$. It is also possible to choose different predefined minimum temperature values $\theta_{m1}$ and $\theta_{m2}$. For example, the predefined minimum temperature of the first part can be higher than the predefined minimum temperature of the second part, $\theta_{m1}>\theta_{m2}$, in order to prioritize the heating of the first part. In FIG. 6, a test 63 shows the comparison of the current temperature $\theta_2$ with the predefined minimum temperature $\theta_{m2}$.

In FIG. 6, a test 61 has been placed before the 63 in order to guarantee that the current temperature $\theta_1$ of the first part definitely remains greater than or equal to the predefined minimum temperature of the first part $\theta_{m1}$ throughout the duration of the second distribution mode. In the opposite case, the method returns to the first distribution mode in order to give priority to the heating of the first part of the probe 10.

As soon as the second part has reached its predefined minimum temperature, it is advantageously possible to change to a third mode of distribution, shown in FIG. 6 by the step 64 which consists in proportionally allocating the maximum available power P to the two parts 14 and 15 of the probe 10.

When the heating wires 31 and 32 are formed by a resistor that is variable with their temperature, the third distribution mode consists in maintaining a constant ratio between the values of resistance of the heating wires for the proportional allocation of the maximum available power to the two parts 14 and 15 of the probe 10.

In this third distribution mode, the current temperatures of the two parts 14 and 15 of the probe 10 can rise above their respective predefined minimum temperatures $\theta_{m1}$ and $\theta_{m2}$. Alternatively, it is possible to limit the power consumed in the probe 10 in order to maintain the current temperatures of the two parts 14 and 15 at their respective predefined minimum temperatures $\theta_{m1}$ and $\theta_{m2}$. This makes it possible to limit the electrical consumption of probe 10. On the other hand, the third distribution mode has the advantage of retaining, for the probe 10, a consumed power that is always constant and predefined. This makes it possible to control the converters exactly in the case of a power supply with DC current or of using all of the alternations in the case of a power supply with AC current. Consequently, less interference is thrown back into the electrical system of the aircraft.

During the first distribution mode, it is possible to trigger an alarm 65 to warn that the first part of the probe has not reached a critical temperature, below which the measurement made by the probe 10 is declared invalid. The critical temperature can be equal to of less than the predefined minimum temperature $\theta_{m1}$. This alarm can be timed and only be triggered after a predefined time during which a temperature lower than the critical temperature is measured.

The invention claimed is:

1. A probe for measuring the total pressure of an airflow, the probe being intended to equip an aircraft, the probe comprising a Pitot tube, two separate heating wires heated separately, allowing each one to heat a part of the probe, and means of distributing a given maximum power to each one of the two heating wires as a function of the current temperature of each of the two parts.

2. The probe according to claim 1, comprising fixing means designed to fix the probe to the skin of the aircraft and a mast connecting the Pitot tube to the fixing means and the first of the two heating wires being intended to heat the Pitot tube forming the first of the two parts and the second of the two heating wires being intended to heat the mast forming the second of the two parts.

3. The probe according to claim 1, the probe being intended to be supplied by means of an AC voltage and the distribution means being arranged to alternately distribute the total available power to each of the heating wires during a number of complete alternations of the AC voltage for each of the heating wires, a ratio between the number of alternations of each of the heating wires being defined in order to obtain a desired power distribution.

4. The probe according to claim 3, the heating wires the heating wires being formed by a resistance that varies with its temperature and the current temperature of each one of the two parts being defined by supplying the two heating wires simultaneously in parallel with the AC voltage during at least one complete alternation and by measuring the value of the current flowing in each one of the heating wires during the simultaneous supplying.

5. The probe according to claim 1, comprising a converter delivering a DC voltage and supplying the heating wires by the intermediary of switches, a switch being associated with each of the heating wires, and the distribution means being arranged to control the switches as a function of a desired power distribution.

6. The probe according to claim 1, comprising, associated with each one of the heating wires, a converter delivering a DC voltage supplying the associated heating wire, and the distribution means being arranged to control the converters as a function of a desired power distribution.

7. A method of using a probe according to claim 1, consisting in priority being given to the reaching of a predefined minimum temperature of a first one of the two parts of the probe by allocating to the first part of the probe a predefined share of the given maximum power for as long as the current temperature of the first part is lower than the predefined minimum temperature.

8. The method according to claim 7, wherein as soon as the first part of the probe has reached the predefined minimum temperature of the first part, the distribution means allocate to the first part a variable share of the given maximum power adapted to maintain the first part at its predefined minimum temperature and allocate to a second of the two parts of the probe the rest of the maximum available power.

9. The method according to claim 8, wherein as soon as the second part has reached a predefined minimum temperature of the second part, the distribution means proportionally allocate the maximum available power to the two parts of the probe.

10. The method according to claim 9, the heating wires being formed by a resistor that varies with its temperature and consisting in maintaining constant a ratio between the values of resistance of the heating wires for the proportional allocation of the maximum available power to the two parts of the probe.

11. The method according to claim 7, an alarm being triggered to warn that the first part of the probe has not reached a critical temperature.

* * * * *